Feb. 4, 1964 M. QUENOT 3,120,059

INSTRUMENT FOR TRACING CIRCLES

Filed Sept. 7, 1962

INVENTOR
Michel Quenot

BY

Holcombe, Wetherill & Brisebois
ATTORNEYS

United States Patent Office
3,120,059
Patented Feb. 4, 1964

3,120,059

INSTRUMENT FOR TRACING CIRCLES

Michel Quenot, Besancon, Doubs, France, assignor to Etablissements Quenot & Cie, Besancon, Doubs, France, a societe a responsabilite limitee Filed Sept. 7, 1962, Ser. No. 222,058
Claims priority, application France Jan. 29, 1962
6 Claims. (Cl. 33—27)

This invention is for improvements in or relating to instruments for tracing circles and has specific reference to an instrument for tracing circles of relatively great radius, of the order of one yard or more, while permitting the direct reading through a window and in front of a reference mark of the radius of the circle being traced.

It is the object of this invention to provide an instrument for tracing circles which comprises a case having wound therein a tape graduated on its rear face, the outer end of this tape being provided with an eyelet and adapted to be pulled out from the case through a slot formed in the front face thereof, near its bottom, spring means incorporated in the case for automatically re-winding the tape after use, means for locking the tape portion extracted from the case, a window with a reference mark on the upper face of the case, through which the tape graduation can be seen, a groove on the inner face of the lateral walls of the case for guiding the edges of the tape from said window to said outer slot, and a lever pivotally mounted on the bottom face of the case, adjacent the rear face thereof, said lever carrying near its outer end a point retractable within the case in the inoperative folded position of said lever against the bottom face of said case, said point being disrected downwards in the operative unfolded position of said lever, wherein said lever constitutes the extension of said bottom face, the tape graduation being so disposed that the number read through said window across said reference mark corresponds to the actual distance between the point carried by said pivoting lever, when the latter is in its operative position, and the eyelet formed in said outer end of the tape.

Thus, when it is desired to use this instrument for tracing a circle, the pivoting lever is simply pulled out from the case to its outermost position in which it is co-extensive with the bottom face of the case, whereafter the point carried by said lever is pressed in the surface on which the circle is to be traced, so that this point constitutes the centre of the circle, to insert a pencil or other tracing point through the eyelet formed in the outer end of the tape, to pull the tape out from the case until the number corresponding to the radius of the desired circle appears through said window in front of said reference mark, to lock the tape in this position and trace the circle by means of the pencil or other tracing point inserted through the eyelet while pivoting the complete instrument about the point sunk in the centre of the circle to be traced.

The attached drawing illustrates diagrammatically by way of example a typical embodiment of the present invention. In the drawing.

The instrument illustrated comprises a case 1 with a window 2 formed in its upper face and provided with a reference mark.

Figures 1, 2, 4, 5, 6, 7, 8:
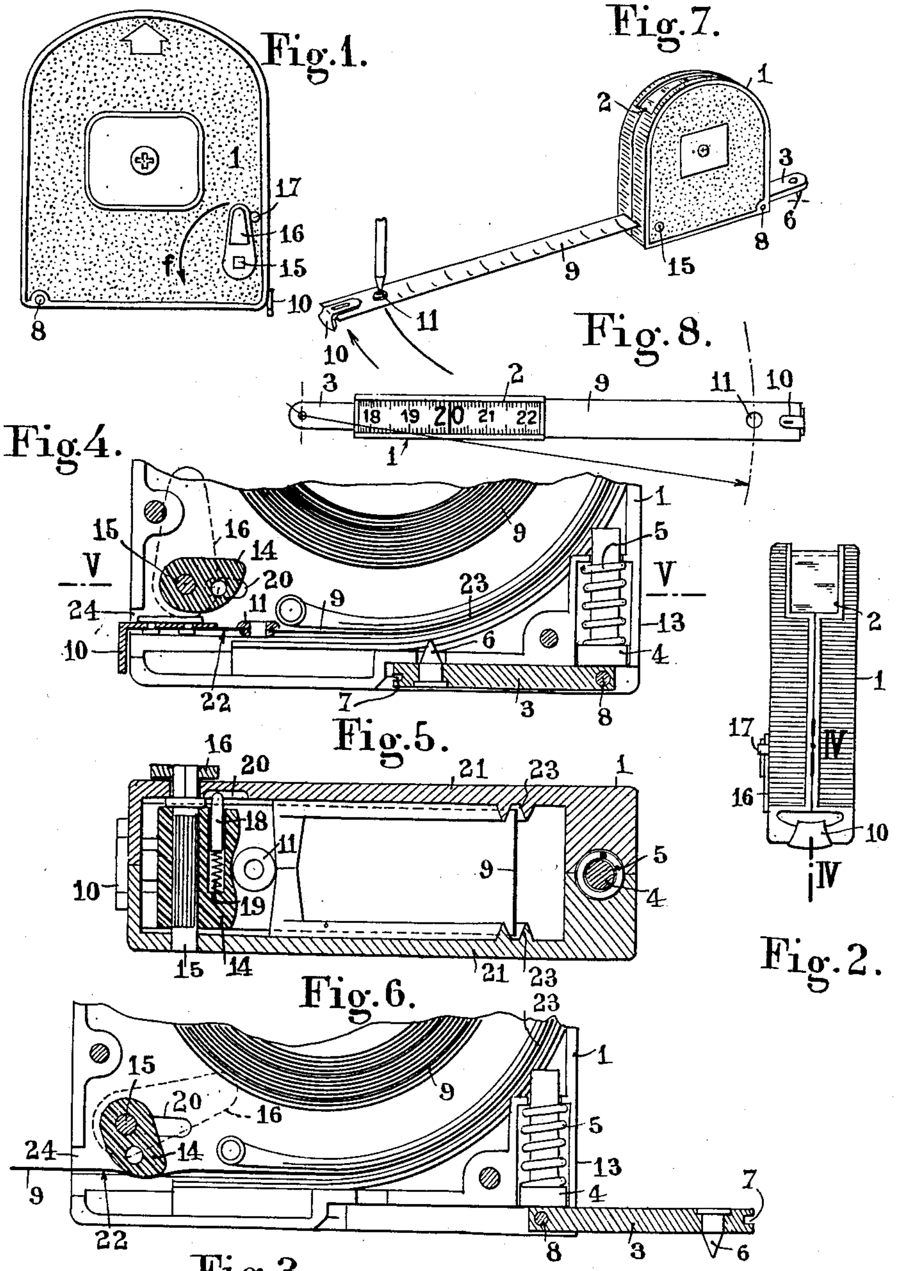
FIGURE 1 is a front elevational view of the instrument.
FIGURE 2 is a side elevational view thereof.
FIGURE 4 is a longitudinal section drawn on a larger scale along the line IV—IV of FIG. 2.
FIGURE 5 is a section taken upon the line V—V of FIG. 4.
FIGURE 6 is a view similar to FIG. 4 but showing the component elements in a different position for tracing a circle.
FIGURE 7 is a perspective view showing the manner in which the instrument is used.
FIGURE 8 is a plan view from above showing the instrument during the tracing of a circle having a radius of 20 centimeters.
Figure 3:
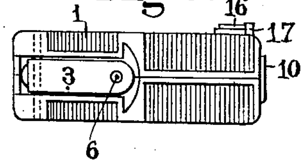
FIGURE 3 is a plan view from beneath.

Disposed in the bottom of this case is a pivoting lever 3 normally urged by a stud 4 responsive to a coil compression spring 5 to its inoperative or folded position as shown in FIG. 4; or alternatively to its operative position, as show nin FIG. 6; this lever 3 carries on its free end a point 6 retractable inside the case in the inoperative or folded position of lever 3.

The free edge of the outer end of lever 3 has a groove 7 formed therein to facilitate its operation; this lever 3 is adapted to pivot about its pivot pin 8 to its operative position shown in FIG. 6.

The measuring tape 9 wound in the case 1 according to the known method comprises a pull hook 10 and is formed with an axially positioned eyelet 11 through which the point of a tracing pencil or other tool may be inserted; this tape is graduated on its back face and its graduation is so arranged that the number read through the window across the reference mark corresponds to the distance measured between the eyelet 11 and the centre point 6; preferably, this graduation is disposed in a central position to facilitate the reading.

The device for locking the tape in the position corresponding to the radius of the circle to be traced consists of an eccentric cam 14 pivotally mounted on a pin 15 and provided with an integral external control lever 16 of which the pivotal movement is limited by a stop 17; in an elongated recess formed in this cam and parallel to the axis of pin 15 is a positioning stud 18 constantly urged outwards by a spring 19; a groove 20 formed in the inner lateral face 21 of case 1 and normally engaged by the stud 18 holds the locking device 14–16 in its inoperative position; when it is desired to lock the tape in a given position the control lever 16 is rotated in the direction of the arrow *f* of FIG. 1, thus moving the cam from the position of FIG. 4 to that of FIGURE 6, the operative end portion of this cam 14 wedging the tape 9 between its edge and the bearing surface 22; the eccentricity of the locking cam will automatically increase the wedging action of the tape locking device when the operator pulls the tape to keep it taut when tracing a circle with the instrument.

Grooves 23 are formed in the inner lateral faces 21 of the case to guide the edges of tape 9 from the window 2 (which is closed preferably by a glass or the like) to the outlet slot 24, so that the length of the tape portion extending from said outlet slot 24 and the reference mark of window 2 remains constant irrespective of the length of tape delivered by the instrument, and the reading taken through the window 2 is accurate under all circumstances.

Of course, the form of embodiment shown and described herein should not be construed as limiting the present invention, as it is given by way of example only and since many modifications may be brought thereto without departing from the spirit and scope of the invention as set forth in the appended claims. Thus, although a centimeter tape graduation is shown in this form of embodiment, it will be readily understood that any other graduation, for example an inch graduation, may be used.

What I claim is:

1. A measuring instrument for tracing circles of a given radius, which comprises a case formed with a slot on its front face in the vicinity of its bottom face, a tape graduated on its outer face and wound in said case with its outer end issuing through said slot, a spring for automatically re-winding the tape in the case, a device pivotally mounted in said case for locking the tape portion extracted therefrom, a window provided with a reference mark on the upper face of said case whereby the tape graduation can be seen therethrough, grooves formed on the inner lateral faces of said case for guiding the tape edges from said window to said outlet slot, an eyelet formed through the outer end of said tape, a lever pivoted on the bottom face of said case in the vicinity of the rear face thereof, said lever carrying a point adjacent to its outer end, said point being retractable within the case in the folded position of said lever against the bottom face of said case, and being directed downwards in the operative position of said lever in which said lever is co-extensive with said bottom face, the graduation on the outer face of said tape being so disposed that the number read through said window across said reference mark corresponds to the actual distance between the point of said pivoting lever in its operative position and the centre of said eyelet.

2. An instrument as set forth in claim 1, wherein a spring constantly urges said pivoting lever to its folded inoperative position or alternately to its unfolded operative position.

3. An instrument as set forth in claim 1, wherein the free end of said pivoting lever is grooved to facilitate its operation.

4. An instrument as set forth in claim 1, wherein the device for locking the tape portion extracted from the case consists of a pivot pin extending transversely between the two side walls of the case, an eccentric cam mounted on said pin, an external control lever, and stop means for limiting the pivoting movement of said cam.

5. An instrument as set forth in claim 4, wherein a stud constantly urged outwards by a spring and housed transversely within said locking cam, and a slot formed in the adjacent region of the relevant lateral wall of the case, are provided for resiliently holding said cam in its inoperative position.

6. An instrument as set forth in claim 1, wherein said graduation is disposed centrally of said tape.

No references cited.